United States Patent
Rogers et al.

(10) Patent No.: US 7,106,847 B1
(45) Date of Patent: *Sep. 12, 2006

(54) TELECOMMUNICATION NETWORK THAT PROVIDES CALLER-ENTERED INFORMATION TO A CALL DESTINATION

(75) Inventors: Carl E. Rogers, Lenexa, KS (US); Joseph Brent Donelan, Olathe, KS (US); Lori L. Brown, Kansas City, MO (US); Warren B. Cope, Olathe, KS (US); Xinjia Ma, Overland Park, KS (US); Steven R. Marah, Olathe, KS (US); Jeffrey A. Bell, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 408 days.

This patent is subject to a terminal disclaimer.

(21) Appl. No.: 10/047,341

(22) Filed: Jan. 15, 2002

(51) Int. Cl.
*H04M 3/42* (2006.01)

(52) U.S. Cl. .............................. 379/211.01; 379/221.07; 379/229; 370/426

(58) Field of Classification Search ............. 379/88.19, 379/88.23, 88.2, 221.02, 219, 220.01, 114.15–114.16, 379/114.19, 114.2, 142.07, 221.08, 22.01, 379/221.11, 221.07, 211.03, 76, 229; 370/426; 709/225

See application file for complete search history.

(56) References Cited

U.S. PATENT DOCUMENTS

| | | | |
|---|---|---|---|
| 5,208,848 A * | 5/1993 | Pula .................... | 379/88.01 |
| 5,386,467 A * | 1/1995 | Ahmad ................. | 379/221.08 |
| 5,418,844 A | 5/1995 | Morrisey et al. | |
| 5,448,633 A | 9/1995 | Jamaleddin | |
| 5,524,146 A * | 6/1996 | Morrisey et al. ...... | 379/221.02 |
| 5,533,115 A * | 7/1996 | Hollenbach et al. ... | 379/221.11 |
| 5,566,235 A * | 10/1996 | Hetz .................... | 379/221.02 |
| 5,572,583 A | 11/1996 | Wheeler, Jr. et al. | |
| 5,590,187 A | 12/1996 | Greenspan | |
| 5,675,635 A | 10/1997 | Vos et al. | |
| 5,680,448 A * | 10/1997 | Becker ................. | 379/221.07 |
| 5,684,866 A | 11/1997 | Florindi et al. | |
| 5,694,463 A | 12/1997 | Christie et al. | |
| 5,696,809 A * | 12/1997 | Voit ..................... | 379/22.01 |
| 5,793,853 A | 8/1998 | Sbisa | |
| 5,825,780 A | 10/1998 | Christie | |
| 5,828,740 A | 10/1998 | Khuc et al. | |
| 5,864,614 A | 1/1999 | Farris et al. | |
| 5,920,562 A | 7/1999 | Christie et al. | |
| 5,923,745 A | 7/1999 | Hurd | |
| 5,926,538 A | 7/1999 | Deryugin et al. | |
| 5,933,486 A | 8/1999 | Norby et al. | |
| 5,949,869 A | 9/1999 | Sink et al. | |
| 5,987,118 A | 11/1999 | Dickerman et al. | |

(Continued)

FOREIGN PATENT DOCUMENTS

DE     199 54 224 A1     5/2001

(Continued)

*Primary Examiner*—Fan Tsang
*Assistant Examiner*—Md. Shafiul Alam Elahee

(57) ABSTRACT

In a telecommunication network, a switching system routes a call to a service platform. The service platform transfers a prompt message over the call, collects caller-entered information from a caller over the call in response to the prompt message, and transfers the caller-entered information to an SCP system. The SCP system transfers the caller-entered information to a destination processor, processes a destination routing code from the destination processor to determine a destination routing instruction, and transfers the destination routing instruction to the switching system. The switching system routes the call to a destination in response to the destination routing instruction.

20 Claims, 5 Drawing Sheets

U.S. PATENT DOCUMENTS

| | | |
|---|---|---|
| 5,993,486 A | 11/1999 | Tomatsu |
| 6,075,855 A | 6/2000 | Christiansen et al. |
| 6,097,803 A | 8/2000 | Sbisa |
| 6,148,069 A * | 11/2000 | Ekstrom et al. ........ 379/221.08 |
| 6,175,618 B1 * | 1/2001 | Shah et al. ............ 379/207.13 |
| 6,215,864 B1 | 4/2001 | Goyal et al. |
| 6,262,992 B1 * | 7/2001 | Nelson et al. ............... 370/426 |
| 6,404,875 B1 * | 6/2002 | Malik et al. ............ 379/211.03 |
| 6,470,081 B1 * | 10/2002 | Sbisa et al. ............ 379/221.09 |
| 6,529,504 B1 | 3/2003 | Sbisa |
| 6,567,659 B1 * | 5/2003 | Sbisa .................... 379/221.09 |
| 6,574,319 B1 * | 6/2003 | Latter et al. ........... 379/142.07 |
| 6,603,851 B1 | 8/2003 | Smith et al. |
| 6,611,590 B1 | 8/2003 | Lu et al. |
| 6,690,656 B1 | 2/2004 | Christie et al. |
| 6,771,762 B1 * | 8/2004 | Chang et al. .......... 379/221.08 |
| 6,804,716 B1 * | 10/2004 | Koch et al. .................. 709/225 |
| 2002/0085687 A1 * | 7/2002 | Contractor et al. ........... 379/76 |
| 2004/0032864 A1 | 2/2004 | Sbisa et al. |

FOREIGN PATENT DOCUMENTS

| | | |
|---|---|---|
| DE | 199 54 224 A 1 | 5/2001 |
| EP | 0 631 447 A2 | 12/1994 |
| EP | 0 901 297 A2 | 3/1999 |
| WO | WO 99/35859 | 7/1999 |
| WO | WO 00/42782 | 7/2000 |

* cited by examiner

| # | ACTION | FROM | TO | DATA |
|---|---|---|---|---|
| 1 | CALL | CALLER 150 | SW SYS 101 | DN #1, ANI |
| 2 | QUERY | SW SYS 101 | SCP SYS 102 | DN #1, ANI |
| 3 | QUERY | SCP SYS 102 | NET RP 103 | DN #1, ANI |
| 4 | RESPONSE | NET RP 103 | SCP SYS 102 | LABEL #1 |
| 5 | RESPONSE | SCP SYS 102 | SW SYS 101 | SW/TNK #1, DNIS #1 |
| 6 | CALL | SW SYS 101 | PLATFORM 104 | DNIS #1, ANI |
| 7 | PROMPT | PLATFORM 104 | SW SYS 101 | AUDIO MESSAGE |
| 8 | PROMPT | SW SYS 101 | CALLER 150 | AUDIO MESSAGE |
| 9 | ENTRY | CALLER 150 | SW SYS 101 | CALLER INFO |
| 10 | ENTRY | SW SYS 101 | PLATFORM 104 | CALLER INFO |
| 11A | CALL | PLATFORM 104 | SW SYS 101 | DN #2, TRACK # |
| 11B | TRANSFER | PLATFORM 104 | SCP SYS 102 | TRACK #, ANI, CALLER INFO |
| 12 | QUERY | SW SYS 101 | SCP SYS 102 | DN#2, TRACK # |
| 13 | QUERY | SCP SYS 102 | DEST RP 111 | ANI, CALLER INFO |
| 14 | RESPONSE | DEST RP 111 | SCP SYS 102 | LABEL #2 |
| 15 | RESPONSE | SCP SYS 102 | SW SYS 101 | SW/TNK #2, DNIS #2 |
| 16 | CALL | SW SYS 101 | DEST SYS 112 | DNIS #2, ANI |
| 17 | TRANSFER | DEST SYS 112 | SW SYS 101 | *8 |
| 18 | TRANSFER | SW SYS 101 | PLATFORM 104 | *8 |
| 19 | DIAL TONE | PLATFORM 104 | SW SYS 101 | DIAL NUMBER |
| 20 | DIAL TONE | SW SYS 101 | DEST SYS 112 | DIAL NUMBER |
| 21 | CALL | DEST SYS 112 | SW SYS 101 | DN #3 |
| 22 | CALL | SW SYS 101 | PLATFORM 104 | DN #3 |
| 23 | CALL | PLATFORM 104 | SW SYS 101 | DN #3, TRACK # |
| 24 | QUERY | SW SYS 101 | SCP SYS 102 | DN #3, TRACK # |
| 25 | QUERY | SCP SYS 102 | DEST RP 121 | ANI, CALLER INFO |
| 26 | RESPONSE | DEST RP 121 | SCP SYS 102 | LABEL #3 |
| 27 | RESPONSE | SCP SYS 102 | SW SYS 101 | SW/TNK #3, DNIS #3 |
| 28 | CALL | SW SYS 101 | DEST SYS 122 | DNIS #3, ANI |

FIG. 2

TELECOMMUNICATION NETWORK THAT PROVIDES CALLER-ENTERED INFORMATION TO A CALL DESTINATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to telecommunication networks that provide caller-entered information to call destinations.

2. Description of the Prior Art

In a telecommunication network, a switching system routes calls from callers to destinations. To determine how to route these calls, the switching systems may transfer queries to a Service Control Point (SCP). The SCP translates dialed telephone numbers into routing instructions, and responds to the switching system with the routing instructions. For example, the SCP might translate an 800 number into a routing instruction that indicates a switch and trunk coupled to the call destination.

As a part of the translation, the SCP may transfer queries to routing processors. The routing processors process the queries to determine labels that ultimately control how the calls are routed. The routing processors transfer the labels to the SCP, and the SCP translates the labels into the routing instructions. Customers of the telecommunication network may operate their own routing processors to control incoming calls. The telecommunication network may also use routing processors to internally route calls within the network.

Many calls require the use of a service platform. The service platform executes call processing scripts, typically selected based on the dialed number, that direct the service platform to apply services to the call. One example of a service is a calling card service where the service platform answers the call and prompts the caller with audio messages to enter their calling card number, a personal identification number, and a number to call. The service platform then checks the numbers and initiates the call to the desired number. Another example of a service is interactive call routing where the service platform prompts the caller to enter a "1" for customer service, "2" for accounting, or a "3" for product ordering, and then the service platform directs the switching system to route the call to the destination selected by the caller.

In many cases, the destination owns and operates call systems that interact with the caller to collect information. For example, an airline may have its own service platform that collects frequent flyer numbers for incoming calls, so the agent has caller information when they answer the call. In other cases, the agents themselves collect the caller information.

To relieve the destination of this burden, the telecommunication network can use its service platform to collect caller information and transfer the caller information to the destination call system. Thus, the destination may have: 1) a routing processor that interacts with the network SCP to direct call routing, 2) a call system that interacts with the network service platform to receive caller information, and 3) call agents to answer calls. Unfortunately, the destination must coordinate the call system and the routing processor if routing decisions are to be made using the caller-entered information.

Calls are often transferred from one destination to another. For example an airline may transfer a call to a car rental agency after booking a flight for the caller. After each transfer, the caller may be required to re-enter the caller information. In addition, the telecommunication network must use service platform capacity to re-collect the caller information.

SUMMARY OF THE INVENTION

The invention helps solve the above problems with a telecommunication network that transfers caller-entered information to a routing processor at a destination. Advantageously, the destination may make call routing and processing decisions based on the caller information, but the destination does not need to own and operate call systems that collect the caller information. Since the telecommunication network provides the caller information directly to the destination routing processor, the destination does not require a separate call system to coordinate and transfer the caller information from the telecommunication network to the routing processor.

Examples of the invention include a telecommunication network and a method of operation for the telecommunication network. The telecommunication network comprises a switching system, a service platform, and an SCP system. The switching system routes a call to a service platform. The service platform transfers a prompt message over the call, collects caller-entered information from a caller over the call in response to the prompt message, and transfers the caller-entered information to the SCP system. The SCP system transfers the caller-entered information to a destination processor, processes a destination routing code from the destination processor to determine a destination routing instruction, and transfers the destination routing instruction to the switching system. The switching system routes the call to a destination in response to the destination routing instruction.

In some examples of the invention, the destination processor selects the destination routing code based on the caller-entered information.

In some examples of the invention, the call from the caller comprises a first call. The service platform transfers a tracking number to the SCP system with the caller-entered information, initiates a second call to the switching system and transfers the tracking number to the switching system with the second call, and connects the first call to the second call. The switching system transfers an SCP query for the second call to the SCP system. The SCP system correlates the SCP query with the caller-entered information based on the tracking number and processes the SCP query to transfer the caller-entered information to the destination processor. The switching system routes the second call to the destination in response to the destination routing instruction, wherein routing the first call to the destination comprises routing the second call to the destination.

In some examples of the invention, the service platform initiates the second call using a different telephone number than the caller used to place the first call.

In some examples of the invention, the service platform applies a call processing script to transfer the prompt message, and wherein, the call processing script indicates the different telephone number.

In some examples of the invention, the caller-entered information comprises a caller identification number or a caller account number.

In some examples of the invention, the caller-entered information comprises a caller frequent flyer number.

In some examples of the invention, the switching system removes the service platform from the call after the service platform collects the caller-entered information.

In some examples of the invention, the SCP system transfers an ANI to the destination processor wherein the destination processor selects the destination routing code based on the ANI.

In some examples of the invention, the destination correlates the caller-entered information with the call received into the destination based on the ANI.

BRIEF DESCRIPTION OF THE DRAWINGS

The same reference number represents the same element on all drawings.

FIG. 2 is a table that describes call and data flow for a telecommunication network in an example of the invention.

DETAILED DESCRIPTION OF THE PREFERRED EMBODIMENT

FIGS. 1–5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
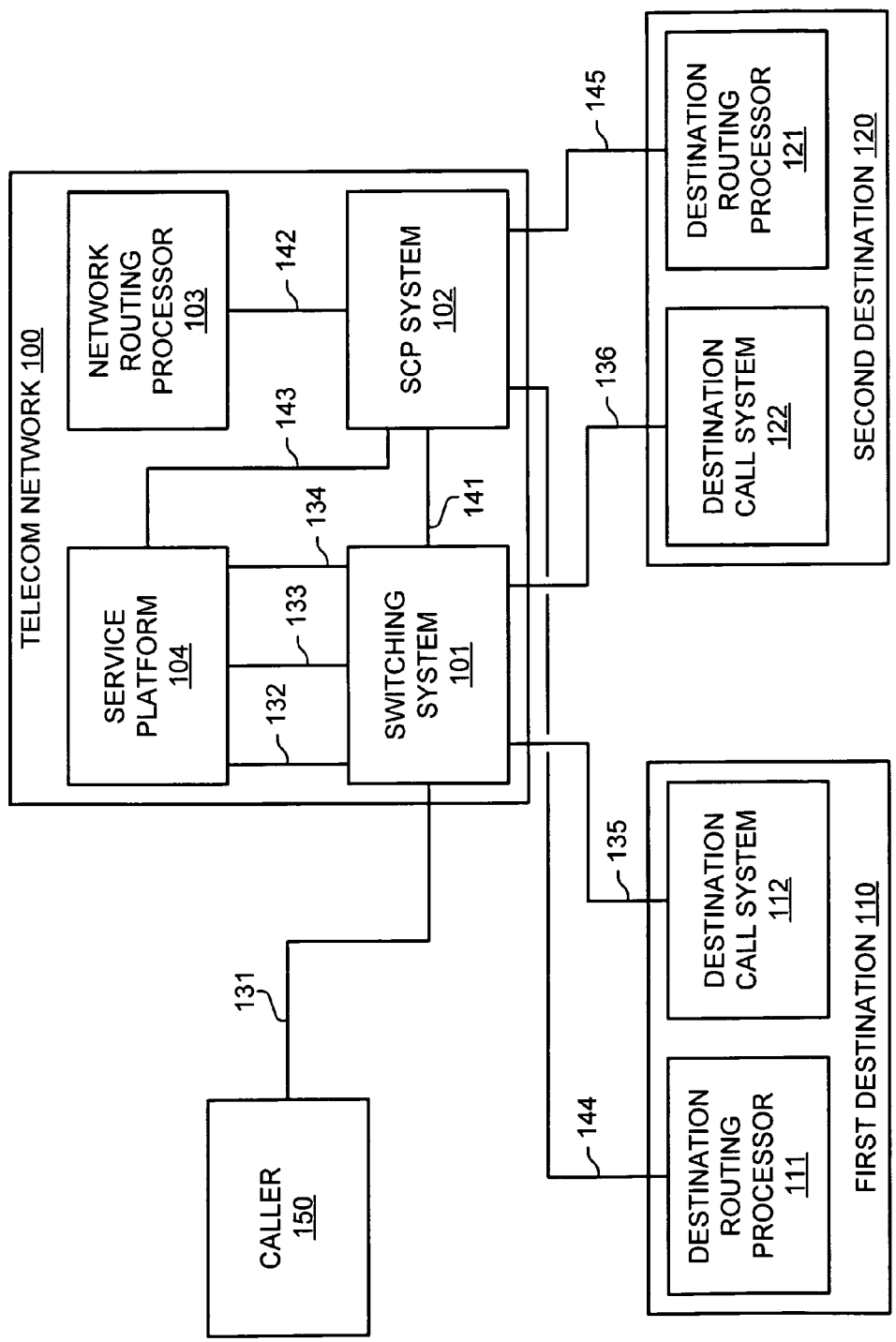
FIG. 1 illustrates a telecommunication network in an example of the invention.

Telecommunication Network Configuration—FIG. 1

FIG. 1 illustrates telecommunication network 100 in an example of the invention. Telecommunication network 100 includes switching system 101, Service Control Point (SCP) system 102, network Routing Processor (RP) 103, and service platform 104. Switching system 101 is coupled to caller 150 over call path 131, to service platform 104 over call paths 132–134, to first destination call system 112 over call path 135, and to second destination call system 122 over call path 136. Call paths 131–136 may each include multiple individual call links and may include other communication systems and networks. SCP system 102 is coupled to switching system 101 by data path 141, to network RP 103 by data path 142, to service platform by data path 143, to first destination RP 111 by data path 144, and to second destination RP 121 by data path 145. Data paths 141–145 may each include multiple individual data links and may include other communication systems and networks.

Switching system 101 could include multiple interconnected telecommunication switches. SCP system 102 could include multiple SCPs, and an SCP includes any call processing system that responds to queries from a switching system with routing instructions. Service platform 104 could include multiple voice response units, control processors, and switches at multiple sites. Network RP 103 could include multiple processors. In variations of the invention, the functionality of network elements 101–104 could be re-distributed from one element to another, and various ones of network elements 101–104 could be integrated together. In addition destination RPs 111 and/or 121 could be hosted by telecommunication network 100. Based on this disclosure, those skilled in the art will appreciate how to modify and combine existing telecommunication components to configure and operate network 100. Those skilled in the art will also appreciate that the operations of network 100 are directed by software that is stored on various storage media.

Telecommunication Network Operation—FIGS. 2–5

Figure 3:
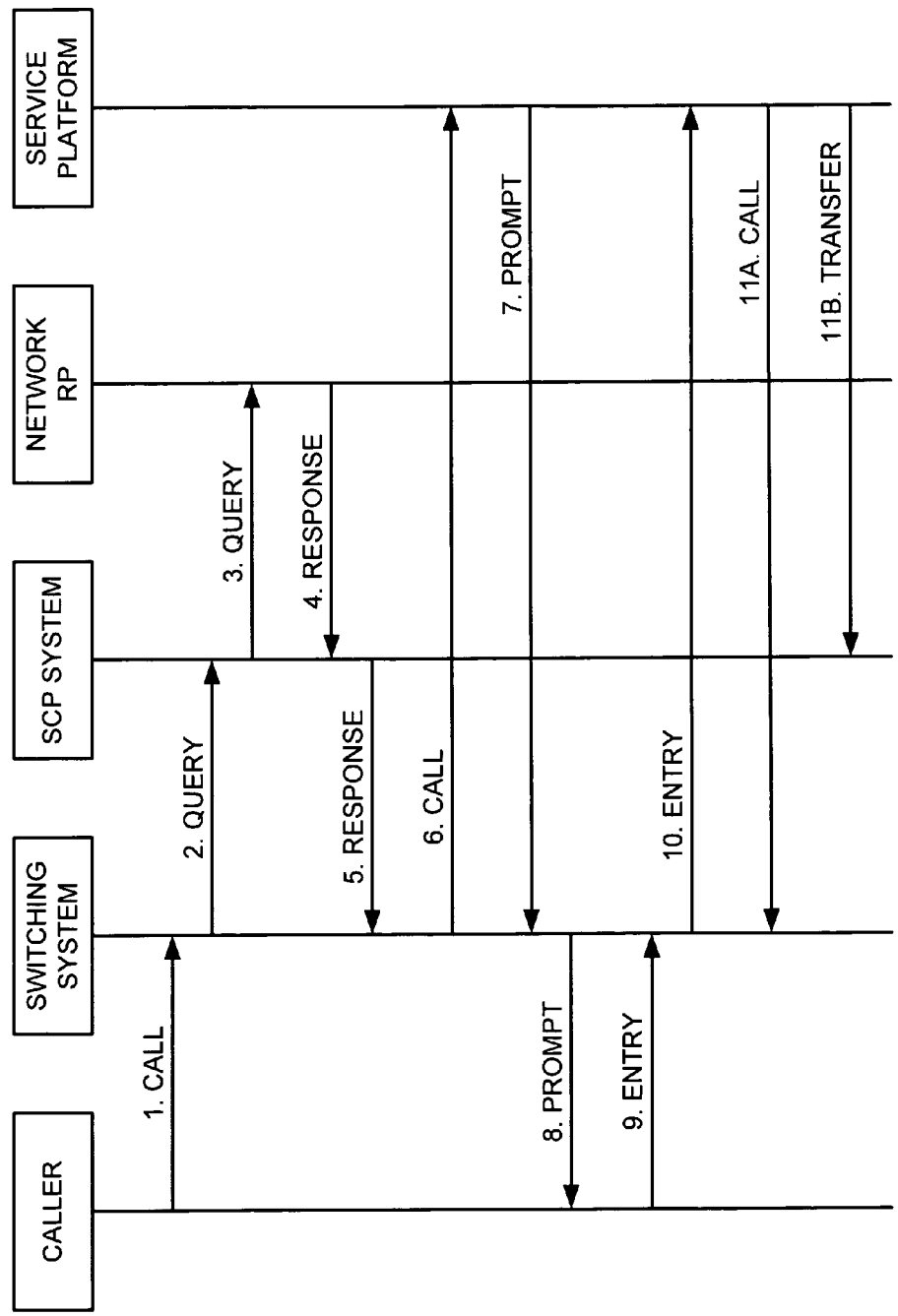
FIG. 3 illustrates the operation of a telecommunication network in an example of the invention.
Figure 4:
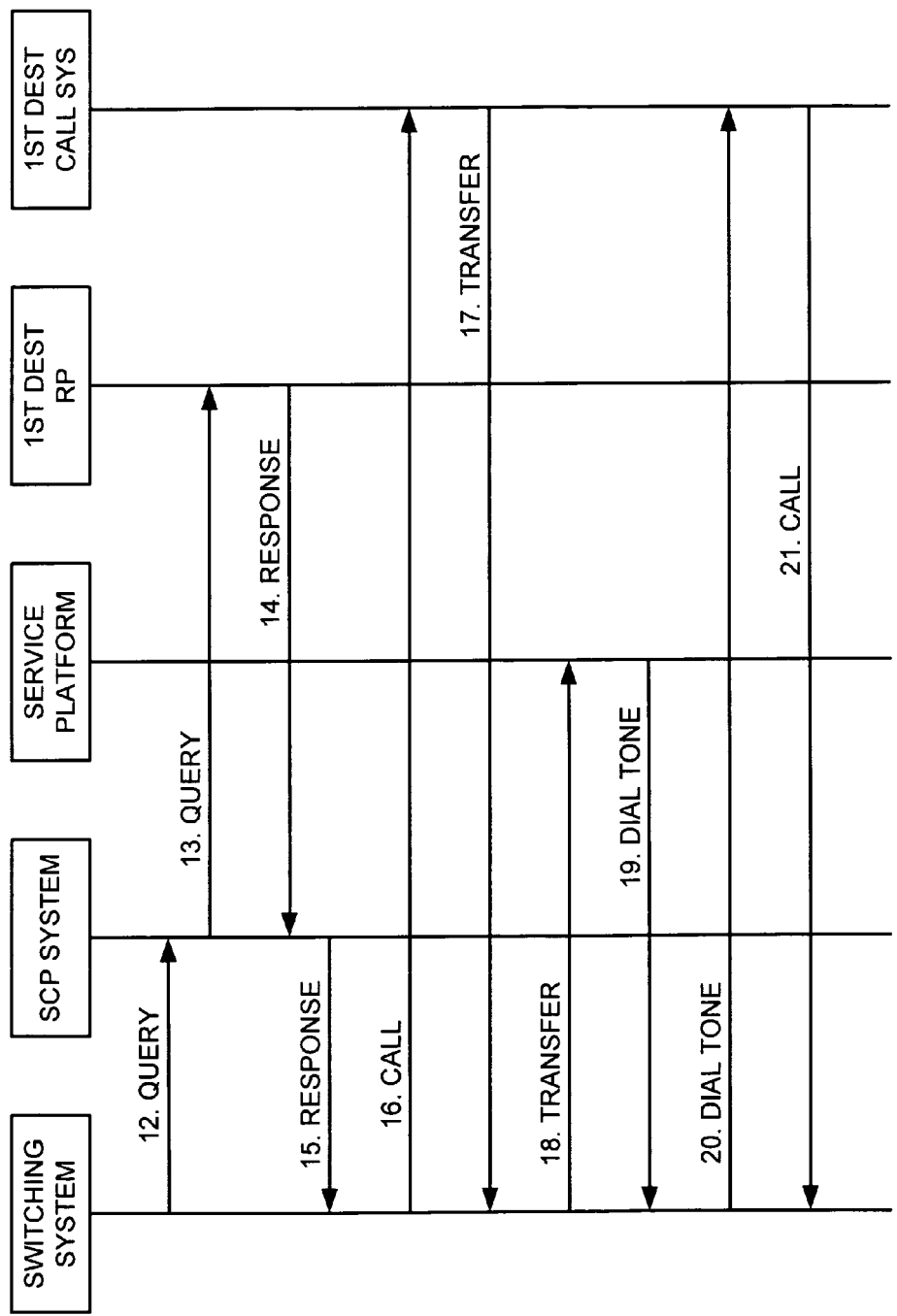
FIG. 4 illustrates the operation of a telecommunication network in an example of the invention.
Figure 5:
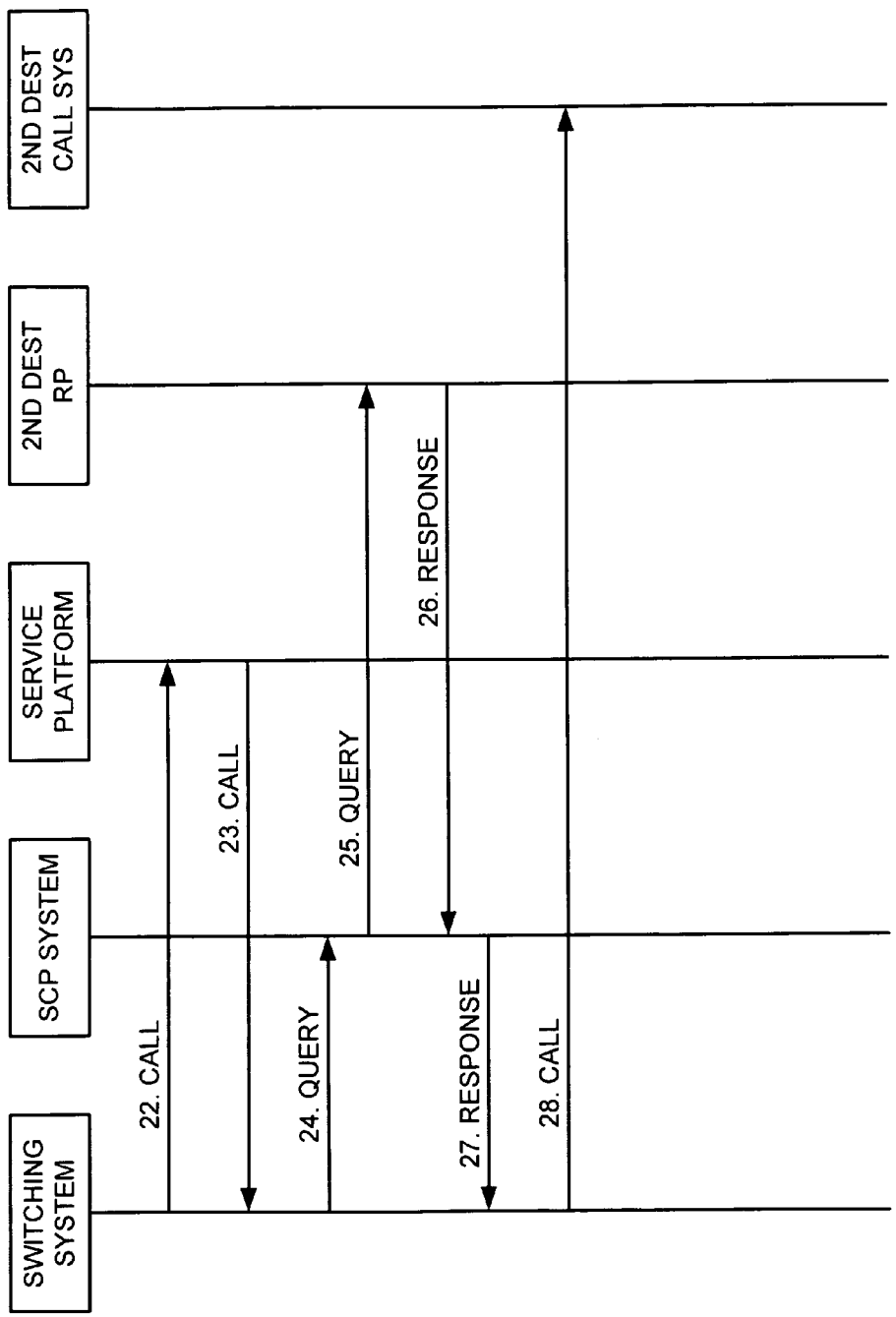
FIG. 5 illustrates the operation of a telecommunication network in an example of the invention.

FIG. 2 is a table that describes call and data flow for telecommunication network 100 in an example of the invention. FIGS. 3–5 illustrate the operation of telecommunication network 100 in an example of the invention. The numbers and actions in the first two columns of FIG. 2 correlate to the numbers and actions of FIGS. 3–5. These actions are indicated parenthetically below.

In operation, caller 150 calls a first Dialed Number (DN #1), and switching system 101 receives the call over call path 131 (action 1). To place the call, caller 150 uses a telephone system that has an associated telephone number that is referred to as an Automatic Number Identification (ANI). Switching system 101 receives DN #1 and the ANI for the call. Switching system 101 processes DN #1, and possibly the ANI, to transfer a query to SCP system 102 (action 2). The query includes DN #1 and the ANI.

SCP system 102 processes DN #1, and possibly the ANI, to transfer a query to network RP 103 (action 3). Network RP 103 processes DN #1, and possibly the ANI, to select a first label (LABEL #1). Labels are routing codes that control subsequent call handling. Network RP 103 transfers a response that indicates LABEL #1 to SCP system 102 (action 4). SCP system 102 processes LABEL #1 through translation tables to identify a first Switch and Trunk (SW/TNK #1) and digits for a first Dialed Number Information Service (DNIS #1). Switch and trunk combinations are routing instructions for switching system 101. SCP system 102 transfers a response indicating SW/TNK #1 and DNIS #1 to switching system 101 (action 5).

Switching system 101 uses SW/TNK #1 to route the call to service platform 104 and to transfer DNIS #1 and the ANI to service platform 104 (action 6). At this point, the call is established from caller 150 to service platform 104 over call path 131, switching system 101, and call path 132.

Service platform 104 processes DNIS #1, and possibly the ANI, to select and apply a call processing script. In response to the call processing script, service platform 104 transfers an audio prompt message to switching system 101 (action 7), and switching system 101 transfers the audio prompt message to caller 150 (action 8). In response to the prompt, caller 150 transfers caller-entered information to switching system 101 (action 9), and switching system 101 transfers the caller-entered information to service platform 104 (action 10).

In some examples of the invention, the caller-entered information comprises Dual Tone Multi-Frequency (DTMF) tones representing caller-entered digits. Some examples of caller-entered digits include caller identification numbers and caller account numbers. For example, the audio prompt could say, "Please enter your frequent flyer number," and caller 150 would provide their frequent flyer number by pressing keys on their telephone to transfer corresponding DTMF digits. Alternatively, service platform 104 may use voice recognition equipment or some other system to collect the caller-entered information over the call.

In response to the call processing script, service platform 104 generates a tracking number that allows telecommunication network 100 to associate data with the call. The tracking number could include an SCP ID, SCP processor ID, and a unique number. In response to the call processing script, service platform 104 initiates a second call to switching system 101 using a second Dialed Number (DN #2) and indicating the tracking number as the ANI (action 11A). Service platform 104 connects the first call to the second call. DN #2 is indicated in the call processing script and is typically different that DN #1. Advantageously, a destination may have multiple DN #1's that all use a single DN #2 to reach the destination. In response to the call processing script, service platform 104 also transfers the ANI, tracking number, and caller-entered information to SCP system 102 (action 11B).

Switching system 101 processes DN #2 to transfer a query to SCP system 102 (action 12). The query includes DN #2 and the tracking number as the ANI. SCP system 102 uses the tracking number to correlate the ANI and the caller-entered information collected by service platform 104 with the second query from switching system 101. SCP system 102 processes DN #2 to transfer a query to destination RP 111 (action 13). This query includes the ANI and the caller-entered information.

Destination RP 111 processes the ANI and the caller-entered information to select a second label (LABEL #2) that will control subsequent call handling. Advantageously, first destination 110 may use the caller-entered information to route the call to a selected call destination. For example, first destination 110 may desire to route privileged customers having special account numbers to higher-quality telephone agents having shorter call queues. Advantageously, first destination 110 uses telecommunication network 100 to collect the caller-entered information, and thus, first destination 110 does not require additional equipment or operator time to collect the information. Destination RP 111 transfers a response that indicates LABEL #2 to SCP system 102 (action 14).

SCP system 102 processes LABEL #2 through translation tables to identify a second Switch and Trunk (SW/INK #2) and digits for a second Dialed Number Information Service (DNIS #2). SCP system 102 transfers a response indicating SW/TNK #2 and DNIS #2 to switching system 101 (action 15). Switching system 101 uses SW/TNK #2 to route the call to destination call system 112 and to transfer DNIS #2 and the ANI to destination call system 112 (action 16). In some examples, the ANI is transferred in a "charge to" field. At this point, the call is established from caller 150 to destination call system 112 over call path 131, switching system 101, ca path 132, service platform 104, call path 133, switching system 101, and call path 135.

Destination call system 112 handles the call. In some examples, destination 110 correlates the call with the caller-entered information based on the ANI. In some examples of the invention, destination 110 may desire to transfer the call. For example, after booking a flight, an airline may desire to transfer the call to a car rental agency. Destination call system 112 initiates the call transfer by transferring DTMF digits, such as "*8", to switching system 101 (action 17). Switching system 101 transfers the DTMF digits to service platform 104 (action 18).

In response to the DTMF digits that indicate call transfer, service platform 104 transfers a dial tone to switching system 101 (action 19), and switching system 101 transfers the dial tone to destination call system 112 (action 20). In response to the dial tone, destination call system 112 transfers a third Dialed Number (DN #3) to switching system 101 (action 21), and switching system 101 transfers DN #3 to service platform 104 (action 22). DN #3 could be a transfer code or speed-dial number.

At this point, service platform 104 and switching system 101 drop the portion of the call over call paths 133 and 135 from service platform 104 to destination call system 112. Thus, the call is still established from caller 150 to service platform 104 over call path 131, switching system 101, and call path 132.

In response to DN #3, service platform 104 initiates a third call to switching system 101 using DN #3 and indicating the tracking number as the ANI (action 23). Service platform 104 connects the first call to the third call. Switching system 101 processes DN #3 to transfer a query to SCP system 102 (action 24). The query includes DN #3 and the tracking number as the ANI. SCP system 102 uses the tracking number to correlate the ANI and the caller-entered information collected by service platform 104 with the third query from switching system 101. SCP system 102 processes DN #3 to transfer a query to destination RP 121 (action 25). This query includes the ANI and the caller-entered information.

Destination RP 121 processes the ANI and the caller-entered information to select a third label (LABEL #3) that will control subsequent call handling. Advantageously, second destination 120 may also use the caller-entered information to route the call to a selected call destination. Advantageously, second destination 120 uses telecommunication network 100 to collect the caller-entered information, and thus, second destination 120 does not require additional equipment or operator time to collect the information. Advantageously for telecommunication network 100 and caller 150, the previously collected caller-entered information may be re-used without re-collection. Destination RP 121 transfers a response that indicates LABEL #3 to SCP system 102 (action 26).

SCP system 102 processes LABEL #3 through translation tables to identify a third Switch and Trunk (SW/TNK #3) and digits for a third Dialed Number Information Service (DNIS #3). SCP system 102 transfers a response indicating SW/TNK #3 and DNIS #3 to switching system 101 (action 27). Switching system 101 uses SW/TNK #3

The invention claimed is:

1. A method of operating a telecommunication network, the method comprising:
   in a switching system, routing a call service platform;
   in the service platform, transferring a prompt message over the call, collecting caller-entered information from a caller over the call in response to the prompt message, and transferring the caller-entered information to a Service Control Point (SCP) system;

in the SCP system, transferring the caller-entered information to a destination processor, processing a destination routing code from the destination processor to determine a destination routing instruction, and transferring the destination routing instruction to the switching system; and in the switching system, routing the call to a destination in response to the destination routing instruction.

2. The method of claim 1 wherein the destination processor selects the destination routing code based on the caller-entered information.

3. The method of claim 1 wherein the call from the caller comprises a first call and further comprising:

in the service platform, transferring a tracking number to the SCP system with the caller-entered information, initiating a second call to the switching system and transferring the tracking number to the switching system with the second call, and connecting the first call to the second call;

in the switching system, transferring an SCP query for the second call to the SCP system;

in the SCP system, correlating the SCP query with the caller-entered information based on the tracking number and processing the SCP query to transfer the caller-entered information to the destination processor; and wherein in the switching system, routing the first call to the destination comprises routing the second call to the destination in response to the destination routing instruction.

4. The method of claim 3 wherein, in the service platform, initiating the second call comprises using a different telephone number than the caller used to place the first call.

5. The method of claim 4 wherein, in the service platform, transferring the prompt message comprises applying a call processing script, and wherein, the call processing script indicates the different telephone number.

6. The method of claim 1 wherein the caller-entered information comprises a caller identification number or a caller account number.

7. The method of claim 1 wherein the caller-entered information comprises a caller frequent flyer number.

8. The method of claim 1 further comprising, in the switching system, removing the service platform from the call after the service platform collects the caller-entered information.

9. The method of claim 1, further comprising, in the SCP system, transferring an Automatic Number Identification (ANI) to the destination processor wherein the destination processor selects the destination routing code based on the ANI.

10. The method of claim 9 wherein the destination correlates the caller-entered information with the call received into the destination based on the ANI.

11. A telecommunication network comprising:

a switching system configured to route a call to a service platform;

the service platform configured to transfer a prompt message over the call, collect caller-entered information from a caller over the call in response to the prompt message, and transfer the caller-entered information to a Service Control Point (SCP) system;

the SCP system configured to transfer the caller-entered information to a destination processor, process a destination routing code from the destination processor to determine a destination routing instruction, and transfer the destination routing instruction to the switching system; and the switching system further configured to route the call to a destination in response to the destination routing instruction.

12. The telecommunication network of claim 11 wherein the destination processor selects the destination routing code based on the caller-entered information.

13. The telecommunication network of claim 11 wherein the call from the caller comprises a first call and wherein:

the service platform is configured to transfer a tracking number to the SCP system with the caller-entered information, initiate a second call to the switching system and transfer the tracking number to the switching system with the second call, and connect the first call to the second call;

the switching system is configured to transfer an SCP query for the second call to the SCP system;

the SCP system is configured to correlate the SCP query with the caller-entered information based on the tracking number and process the SCP query to transfer the caller-entered information to the destination processor; and the switching system is configured to route the second call to the destination in response to the destination routing instruction, wherein routing the first call to the destination comprises routing the second call to the destination.

14. The telecommunication network of claim 13 wherein the service platform is configured to initiating the second call using a different telephone number than the caller used to place the first call.

15. The telecommunication network of claim 14 wherein the service platform is configured to apply a call processing script to transfer the prompt message, and wherein, the call processing script indicates the different telephone number.

16. The telecommunication network of claim 11 wherein the caller-entered information comprises a caller identification number or a caller account number.

17. The telecommunication network of claim 11 wherein the caller-entered information comprises a caller frequent flyer number.

18. The telecommunication network of claim 11 wherein the switching system is configured to remove the service platform from the call after the service platform collects the caller-entered information.

19. The telecommunication network of claim 11 wherein the SCP system is configured to transfer an Automatic Number Identification (ANI) to the destination processor wherein the destination processor selects the destination routing code based on the ANI.

20. The telecommunication network of claim 19 wherein the destination correlates the caller-entered information with the call received into the destination based on the ANI.

* * * * *